United States Patent
Lindoff

(10) Patent No.: US 9,191,838 B2
(45) Date of Patent: Nov. 17, 2015

(54) METHOD OF ADAPTING THE PARAMETER SET OF A MOBILE TERMINAL TRANSCEIVER BASED UPON ITS GEOGRAPHICAL POSITION

(75) Inventor: Bengt Lindoff, Bjärred (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/239,860

(22) PCT Filed: Aug. 17, 2012

(86) PCT No.: PCT/EP2012/066061
§ 371 (c)(1),
(2), (4) Date: Feb. 20, 2014

(87) PCT Pub. No.: WO2013/026783
PCT Pub. Date: Feb. 28, 2013

(65) Prior Publication Data
US 2014/0206339 A1    Jul. 24, 2014

Related U.S. Application Data

(60) Provisional application No. 61/530,472, filed on Sep. 2, 2011.

(30) Foreign Application Priority Data

Aug. 24, 2011  (EP) ..................................... 11178731

(51) Int. Cl.
*H04W 24/02* (2009.01)
*H04W 4/02* (2009.01)
*H04W 28/18* (2009.01)
*H04W 4/00* (2009.01)

(52) U.S. Cl.
CPC .............. *H04W 24/02* (2013.01); *H04W 4/001* (2013.01); *H04W 4/02* (2013.01); *H04W 4/025* (2013.01); *H04W 28/18* (2013.01)

(58) Field of Classification Search
CPC ..... H04W 24/02; H04W 28/18; H04W 4/001; H04W 4/02; H04W 4/025
USPC ........ 455/436, 444, 550.1, 420, 422.1, 456.1; 370/328, 338
See application file for complete search history.

(56) References Cited

U.S. PATENT DOCUMENTS

| | | |
|---|---|---|
| 6,750,813 B2 | 6/2004 | Vargas-Hurlston et al. |
| 2003/0003922 A1 | 1/2003 | McClure |
| 2006/0258295 A1 | 11/2006 | Wong et al. |

(Continued)

FOREIGN PATENT DOCUMENTS

| | | |
|---|---|---|
| EP | 1224826 B1 | 7/2008 |
| WO | 03079216 A1 | 9/2003 |
| WO | 2010062630 A1 | 6/2010 |

*Primary Examiner* — Babar Sarwar
(74) *Attorney, Agent, or Firm* — Coats & Bennett, PLLC

(57) ABSTRACT

A method of a transceiver arranged to operate according to a Radio Access Technology, RAT, in a cellular communication system is disclosed. The method comprises determining (100) a position value for the transceiver; accessing (104) a database based on the determined position value, wherein a transceiver parameter set corresponding to the position value is acquired, wherein the transceiver parameter set is arranged to adapt operation of the transceiver for the determined position within the RAT; and applying (106) settings of the transceiver according to the acquired transceiver parameter set. A transceiver and a computer program are also disclosed.

16 Claims, 2 Drawing Sheets

(56) References Cited

U.S. PATENT DOCUMENTS

| | | | |
|---|---|---|---|
| 2009/0011773 A1* | 1/2009 | Balachandran et al. | 455/456.1 |
| 2010/0120435 A1* | 5/2010 | Mia et al. | 455/440 |
| 2010/0124934 A1* | 5/2010 | Mach | 455/456.1 |
| 2010/0216467 A1 | 8/2010 | Ryan et al. | |
| 2010/0304761 A1* | 12/2010 | Seibert et al. | 455/456.4 |

* cited by examiner

METHOD OF ADAPTING THE PARAMETER SET OF A MOBILE TERMINAL TRANSCEIVER BASED UPON ITS GEOGRAPHICAL POSITION

TECHNICAL FIELD

The present invention generally relates to a method of adapting a transceiver, to such a transceiver, and a computer program for implementing the method.

BACKGROUND

The increase of traffic in cellular communication systems the last few years very much relates to mobile internet and mobile broadband. The traffic increase in turn makes it important to optimize the capacity and performance in the cellular network. Therefore a throughput and connection robustness has increased in importance also for transceivers of the cellular network, since optimized radio performance will not only be a benefit for the end user but also for the operator which by better transceiver performance can improve the spectral efficiency and hence also the capacity in the network.

Cellular communication systems like HSPA and LTE is and will be deployed by hundreds of operators all over the world, all operating in different radio environments. From a terminal point of view, a transceiver parameter settings, like selectivity filter coefficients, Radio Resource Management filter parameters, etc, optimized for, say operator A, will typically not optimize the performance for operator B, or even for operator A in another region/country or geographical position. WO 2010/062630 discloses an approach for acquiring information of a suitable Radio Access Technology (RAT) to use for a certain position, and information on certain settings specific for the advised RAT. A typical traditional solution is to use parameter settings that are a trade off, implying good but not optimized performance for most scenarios. Updates of parameter settings are then typically made only on event basis, for instance when a certain problem have occurred in a certain area for a certain operator. Then a retuning of parameters are made, which may solve/optimise the performance for that specific area/operator. However this typically will worsen the performance in another area.

Therefore there is a need for an approach for optimised radio performance regardless of operator and/or geographical position.

SUMMARY

An object of the invention is to at least alleviate the above stated problem.

According to a first aspect, there is provided a method of a transceiver arranged to operate according to a Radio Access Technology, RAT, in a cellular communication system. The method comprises determining a position value for the transceiver; accessing a database based on the determined position value, wherein a transceiver parameter set corresponding to the position value is acquired, wherein the transceiver parameter set is arranged to adapt operation of the transceiver for the determined position within the RAT; and applying settings of the transceiver according to the acquired transceiver parameter set.

The position value may comprise a cell identity for a serving cell which the transceiver is in communication with. Additionally or alternatively, the position value may comprise a geographical position acquired through a global navigation satellite system or through position signals from the RAT.

The parameter set may comprise radio resource management parameters comprising filter coefficients for filtering signal strength measurements used for mobility and handover management. Additionally or alternatively, the parameter set may comprise selectivity filter coefficients. Additionally or alternatively, the parameter set may comprise an adapted baseband algorithm. The adapted baseband algorithm may comprise an adapted automatic gain control algorithm. Additionally or alternatively, the parameter set may comprise a decoder setting. The decoder setting may comprise an algorithm arranged to detect interference pattern, and to reduce parts of the received signal corresponding to the detected interference pattern.

The method may further comprise receiving a request from a remote node of the cellular communication system on finding updated parameters on the determined position; upon reception of the request, performing a parameter optimisation to find an optimised parameter set for the position; and transmitting a report to the cellular communication system on found optimised parameter set.

According to a second aspect, there is provided a transceiver arranged to operate according to a Radio Access Technology in a cellular communication system. The transceiver comprises a position determinator arranged to determine a position value for the transceiver; database accessing means arranged to access a database based on the determined position value, wherein a transceiver parameter set corresponding to the position value is acquired, wherein the transceiver parameter set is arranged to adapt operation of the transceiver for the determined position within the RAT; and a controller arranged to apply settings of the transceiver according to the acquired transceiver parameter set.

The transceiver may further comprise the database. Alternatively, the database accessing means may further be arranged to access the database via communication to the cellular communication system.

The position determinator may comprise a receiver arranged to receive signals from a global navigation satellite system, and a position decoder may be arranged to determine the position from the received global navigation satellite system signals or through position signals from the RAT.

According to a third aspect, there is provided a computer program comprising instructions, which when executed by a processor of a transceiver causes the transceiver to perform the method according to the first aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed

DETAILED DESCRIPTION

Figure 1:
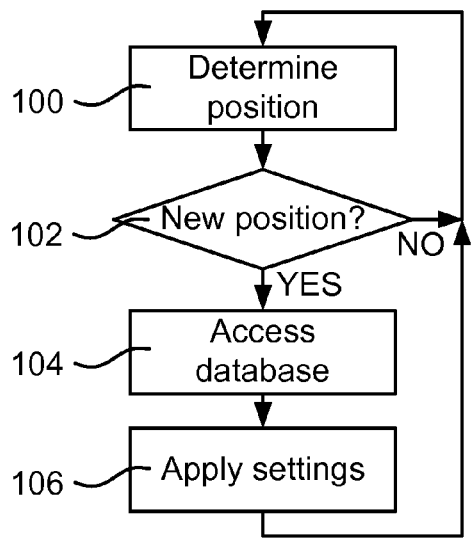
FIG. 1 is a flow chart illustrating a method according to an embodiment.

The invention is based on the approach that a data base is created mapping transceiver parameters to positions or areas, e.g. to operator and unique cell identity such as global cell identity (GCI), which is unique for each cell, thus giving positioning information, and/or a geographical position, as for example given by a global navigation satellite system (GNSS) such as GPS (Global Positioning System) or GLO-NASS (GLObal NAvigation Satellite System). Then a terminal camping on or connected to a certain cell, by determination of the GCI and/or the geographical position, determines the optimised parameter set that is downloaded and the transceiver is updated with the parameter set. Even some Radio Access Technologies (RATs) have position signals that can be transmitted, upon request from the network, and used to determine the position of the terminal. For example, in Long Term Evolution (LTE) there are specific LTE position pilots that can be transmitted and used by the terminal to determine the relative timing of such Reference Signals (RSs) from different cells, and that in combination with the base station GPS coordinates, the terminal position can be determined. Hence RAT based position system can be used to determine the terminal position.

Example of parameters that can be included in the data base are Radio Resource Management (RRM) filter parameters, certain selectivity filter coefficients or baseband algorithms, such as Automatic Gain Control (AGC), Automatic Frequency Control (AFC), channel estimation, turbo decoding, etc. algorithms, optimised for specific interference scenarios at the particular position, such as radar interference or other strong blocking signals. Further, parameters related to channel estimation or decoding, such as turbo decoding, can be provided.

The data base can be stored in the mobile terminal and updated at some scheduled or regular time points. It could also be a remote data base where the position and GCI is transmitted over the air interface on e.g. the application layer and a certain parameter set value is then transmitted back to the terminal from the data base. Alternatively, the data base may be stored on the Internet.

Before completing the creation of the database, it is typically filled with a default parameter setting used for a majority of the cells/positions, but with exceptions used at certain positions where adaptations are prima facie needed for optimised performance. Examples here could be at positions with severe radio channel characteristics with high load, such as Manhattan scenarios, where certain RRM parameters are needed. Another example could be areas where specific interference patterns can be determined, e.g. close to radar stations, where specific filter parameters or baseband algorithms are needed. The database is typically updated based on field trials, but can also be updated "on the fly" by a terminal doing experiments to determine parameter set for optimised performance. Scheduling of such experiments, measurement and determinations can be made by the communication system which can send a request for the operations to a suitable terminal. The scheduling of such experiments could also be made by an application outside the communication system. In this case the database may be stored on the Internet and hence not being part of the particular communication system. With knowledge about the specific RAT to be used by the communication system, the parameters may be adapted, without involvement of the communication system.

FIG. 1 is a flow chart illustrating actions at a terminal for performing a method of a transceiver according to an embodiment. It should here be noted that the context of the approach is to improve operation within a Radio Access Technology (RAT), for example but not limited to WCDMA, LTE or GSM, in a cellular communication system. Optimisation by selecting one of several available RATs is of course possible, but the invention deals with the optimisation within the selected RAT for improved, or further improved, considering if optimisation by selection of RAT has been made, operation. A position value for the transceiver is determined 100, wherein it can be judged 102 if a new position compared to a possible previous determination of the position of the transceiver is present. If the transceiver is determined 102 to be in the same position or area, the procedure returns to make a new determination 100 of the position, e.g. after a certain time. Here, the granularity of positions or areas can be chosen, e.g. upon creating the database, based on how large areas that are considered to have similar signal conditions. The judgement 102 then becomes depending on that granularity. If a new position is judged 102 to be present, a database is accessed 104 based on the determined position value, wherein a transceiver parameter set corresponding to the position value is acquired. The transceiver parameter set is arranged to adapt operation of the transceiver for the determined position within the RAT, as has been demonstrated above. The settings of the transceiver are applied 106 according to the acquired transceiver parameter set. The procedure can then return to determine a new position at a later time, e.g. based on a position determination schedule or a system event indicating that a new position may be present, wherein mobility features are properly maintained.

An example can be a terminal is camping, i.e. being in idle mode, or connected to a serving, i.e. at active mode, cell. The terminal is determining the global cell identity (GCI) for that particular cell. GCI is a uniquely defined identity for each cell and operator, and is typically transmitted in a broadcast message, e.g. in a System Information Broadcast (SIB) in LTE or HSPA. The terminal then determines from a data base the transceiver parameter set to be used for that particular GCI. Then the transceiver is updated with the proposed parameter set, and that one is used until a handover (HO) or cell reselection is made.

Another example can be the terminal is camping or connected to a serving cell. The terminal is determining the current geographical position. This can be made using GPS or another positioning system. The terminal then determines from a data base the transceiver parameter set to be used for that particular position. Then the transceiver is updated with the parameter set, and that parameter set is used until a new geographical position is detected.

A further example can be that the combination of both GCI and geographical position can be used for determination of suitable parameter set, wherein the parameter set is provided from the database and then being applied at the transceiver.

One group of examples of what can be comprised in the parameter set can relate to RRM. Typically, this can be filter coefficients for filtering the RSRP/RSCP (Reference Signal Received Power/Reference Signal Code Power) measurements used for mobility and HO. In complex radio environments with large load, for example the Manhattan scenario, typically short filter constants are needed in order to be able to do HO at correct time instants. Using such short filter in other scenarios might give rise to undesirable HO ping pong effects, therefore a data base approach will improve the overall performance compared to only have long or short filter constants.

Another group of examples of what can be comprised in the parameter set can relate to selectivity filter coefficients. At certain places specific interference from other transmitters can exists. In such places it could be good to have narrowband selectivity filters suppressing the interference. Such narrowband filters might on other places degrade the performance. Thus, there is an advantage using such filters only when necessary.

Another group of examples of what can be comprised in the parameter set can relate to baseband algorithms. At certain places specific interference from other transmitters, like radars, can exists. This may introduce, e.g. pulse wise, interference and AGC algorithms, for instance, might be adapted so that the AGC is not updated during the pulses.

Another group of examples of what can be comprised in the parameter set can relate to decoding properties. Again in places where specific interference patterns exist, one could utilise that knowledge to reduce, e.g. null, certain soft values, affected by such pulses. Algorithms for detection of the pulse repetition and phase as well as the soft value reduction could be enabled at such positions. Having such algorithms running all the time will typically increase the power consumption, but, which is more important, due to false alarm detection, degrade the overall performance once enabled but not needed.

The parameter set can further adapt behaviour of elements for analog-to-digital conversion by e.g. adapting signal quantization levels, for analog radio parts by e.g. controlling supply voltages, biasing and such, for adapting conversion between time-domain and frequency domain, for adapting timing and scheduling of events, etc., to optimise performance for each place the transceiver happens to be at. The optimised performance can provide advantages of improved receiving quality where needed, low power consumption where possible, and improved throughput for the given circumstances of the actual position.

Figure 2:
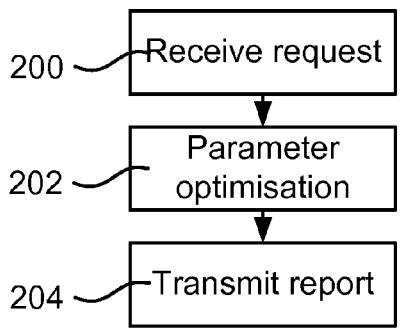
FIG. 2 is a flow chart illustrating method steps according to embodiments including update of database with aid of transceiver.

The data base is typically filled with a default parameter setting used for a majority of the cells/positions, but with exceptions used at certain positions where adaptations are needed for optimised performance as demonstrated in the examples above. As also demonstrated above, data base is typically updated based on field trials, but can also be updated "on the fly" by a terminal doing experiments to determine parameter set for optimized performance. The data base could also be updated with new information once a terminal reporting a new GCI at a certain position where the data base does not have information or have old, e.g. obsolete for instance due to updated cell planning, information. Then in some embodiments of the invention, the terminal can be ordered to do these experiments for detection of optimised parameter set. FIG. 2 is a flow chart illustrating the method according to an embodiment performed at the transceiver at such a trial. A request for experimentation, trials, optimisation and/or measurements is received 200 from the cellular communication system. The transceiver performs the experimentation, trials, optimisation and/or measurements 202, and then reports 204 by a transmission of acquired result back to the cellular communication system. If the transceiver is holding its own database, the result may also be stored therein.

The data base can for instance be stored in the terminal. The data base can then be updated on event basis, for instance when doing software upgrades. In another embodiment, a remote data base can be used where the terminal, e.g. on the application level, informs the data base about the GCI and/or geographical position and in return receives the parameter set or a parameter set index to be used. The parameter set index can be translated to a certain parameter set that is used by the lower layers, i.e. applied as illustrated by the application step 106 of FIG. 1.

Figure 3:
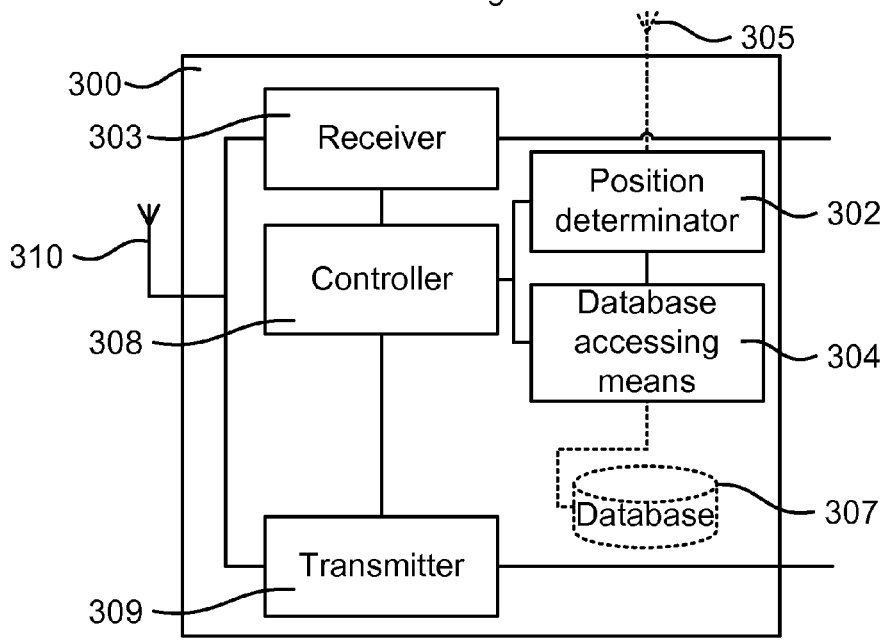
FIG. 3 is a block diagram schematically illustrating a transceiver according to some embodiments.

FIG. 3 is a block diagram schematically illustrating a transceiver 300. The block should be construed functionally, and hashed-line elements are optional. The transceiver 300 comprises a position determinator 302 arranged to determine a position value for the transceiver 300. As described above, the position can be determined from a unique cell ID, and in that case, the position determinator gets its input from system information provided over radio interface of the cellular system, i.e. information received by a receiver 303 of the transceiver 300. The position can also be determined from a positioning system, e.g. a GNSS, from which signals can be received via an antenna 305, and the signals can be used to calculate a position.

The transceiver further comprises a database accessing means 304 arranged to access a database based on the determined position value, wherein a transceiver parameter set corresponding to the position value is acquired. As demonstrated above, the transceiver parameter set is arranged to adapt operation of the transceiver for the determined position within the RAT. The database may be an internal database 307 of the transceiver, or an external database, provided in another node of the cellular communication system, which then is accessed via the radio interface of the cellular communication system. The external database can for example be implemented as a server in a parameter service centre and be accessed via the serving base station, then via a parameter service gateway of the cellular communication system. In the case of the database being external from the transceiver, the database accessing means 304 then can transmit a request for parameters via a transmitter 309 of the transceiver, which via an antenna 310 of the transceiver provides a transmission to the cellular communication system, and in return can the parameter set or parameter index be received by the receiver 303, from which the database accessing means acquires the parameter set or parameter index.

Figure 4:
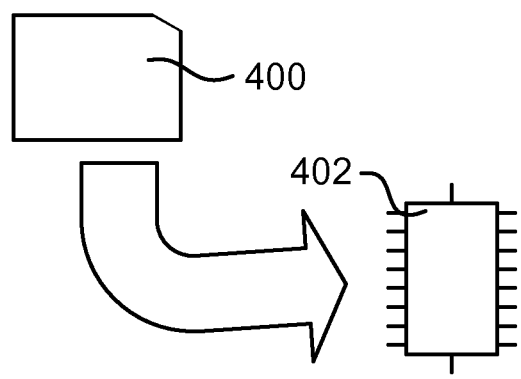
FIG. 4 schematically illustrates a computer-readable medium comprising instructions, which when executed on the illustrated processor are arranged to implement any of the embodiments of method illustrated in FIG. 1 or 2.

The transceiver 300 further comprises a controller 308 arranged to, among other things such as scheduling and controlling interaction between the other elements, apply settings of the transceiver 300 according to the acquired transceiver parameter set. Not to obscure the principle and elements of acquiring the parameter set, which is the purpose of FIG. 3, the different elements, such as filters, baseband circuitry, signal processing circuitry, etc., which are adapted by the parameter set are not illustrated. However, the person skilled in the art would from the described examples above readily recognise and adapt those elements. The methods according to the present invention is suitable for implementation with aid of processing means, such as computers and/or processors, especially for the case where the transceiver as depicted in FIG. 3 is controlled by processor means. Therefore, there is provided computer programs, comprising instructions arranged to cause the processing means, processor, or computer to perform the steps of any of the methods according to any of the embodiments described with reference to FIGS. 1 and 2. The computer programs preferably comprises program code which is stored on a computer readable medium 400, as illustrated in FIG. 4, which can be loaded and executed by a processing means, processor, or computer 402 to cause it to perform the methods, respectively, according to embodiments of the present invention, preferably as any of the embodiments described with reference to FIGS. 1 and 2. The computer 402 and computer program product 400 can be arranged to execute the program code sequentially where actions of the any of the methods are performed stepwise. The processing means, processor, or computer 402 is preferably what normally is referred to as an embedded system. Thus, the depicted computer readable medium 400 and computer 402 in FIG. 4 should be construed to be for illustrative purposes only to provide understanding of the principle, and not to be construed as any direct illustration of the elements.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling a transceiver operating according to a Radio Access Technology (RAT) in a cellular communication system, the method comprising:
   determining a position value for the transceiver operating according to the RAT in the cellular communication system;
   accessing a database, based on the determined position value, to acquire a transceiver parameter set corresponding to the position value, wherein the transceiver parameter set is arranged to adapt continued operation of the transceiver within the RAT and for the determined position value; and
   applying settings to the transceiver according to the acquired transceiver parameter set;
   receiving a request, from a remote node of the cellular communication system, to find updated parameters on the determined position value;
   in response to reception of the request, performing a parameter optimization to find an optimized parameter set for the position value; and
   transmitting a report, to the cellular communication system, of the found optimized parameter set.

2. The method of claim 1, wherein the position value comprises a cell identity for a serving cell which the transceiver is in communication with.

3. The method of claim 1, wherein the position value comprises a geographical position acquired through a global navigation satellite system.

4. The method of claim 1, wherein the position value comprises a geographical position acquired through position signals from the RAT.

5. The method of claim 1, wherein the parameter set comprises radio resource management parameters comprising filter coefficients for filtering signal strength measurements used for mobility and handover management.

6. The method of claim 1, wherein the parameter set comprises selectivity filter coefficients.

7. The method of claim 1, wherein the parameter set comprises an adapted baseband algorithm.

8. The method of claim 7, wherein the adapted baseband algorithm comprises an adapted automatic gain control algorithm.

9. The method of claim 1, wherein the parameter set comprises a decoder setting.

10. The method of claim 9, wherein the decoder setting comprises an algorithm to:
    detect interference pattern; and
    reduce parts of the received signal corresponding to the detected interference pattern.

11. A transceiver operating according to a Radio Access Technology (RAT) in a cellular communication system, the transceiver comprising:
    cellular communication circuitry configured to operate according to the RAT in the cellular communication system;
    a position determination circuit configured to determine a position value for the transceiver;
    a database accessing circuit configured to access a database based on the determined position value to acquire a transceiver parameter set corresponding to the position value, wherein the transceiver parameter set is arranged to adapt continued operation of the transceiver within the RAT and for the determined position value; and
    a control circuit configured to apply settings to the transceiver according to the acquired transceiver parameter set;
    one or more processing circuits configured to:
    receive a request, from a remote node of the cellular communication system, to find updated parameters on the determined position value;
    in response to reception of the request, perform a parameter optimization to find an optimized parameter set for the position value; and
    transmit a report, to the cellular communication system, of the found optimized parameter set.

12. The transceiver of claim 11, further comprising the database.

13. The transceiver of claim 11, wherein the database accessing circuit is further configured to access the database via communication to a remote node of the cellular communication system.

14. The transceiver of claim 11, wherein the position determination circuit comprises:
    a receiver arranged to receive navigation system signals from a global navigation satellite system; and
    a position decoding circuit configured to determine the position from the received navigation system signals.

15. The transceiver of claim 11, wherein the position determination circuit comprises:
    a receiver arranged to receive position signals from the RAT; and
    a position decoding circuit configured to determine the position from the received position signals.

16. A computer program product stored in a non-transitory computer readable medium for controlling a transceiver operating according to a Radio Access Technology (RAT) in a cellular communication system, the computer program product comprising software instructions which, when run on one or more processing circuits of the transceiver, causes the transceiver to:
    determine a position value for the transceiver operating according to the RAT in the cellular communication system;
    access a database, based on the determined position value, to acquire a transceiver parameter set corresponding to the position value, wherein the transceiver parameter set is arranged to adapt continued operation of the transceiver within the RAT and for the determined position value; and
    apply settings to the transceiver according to the acquired transceiver parameter set;

receive a request, from a remote node of the cellular communication system, to find updated parameters on the determined position value;

in response to reception of the request, perform a parameter optimization to find an optimized parameter set for the position value; and transmit a report, to the cellular communication system, of the found optimized parameter set.

\* \* \* \* \*